United States Patent [19]

Seguine

[11] 4,378,317
[45] Mar. 29, 1983

[54] PROCESS TO MAINTAIN BLAND TASTE IN ENERGY EFFICIENT OIL DEODORIZATION SYSTEMS

[75] Inventor: Edward S. Seguine, Fairfield, Ohio

[73] Assignee: The Procter & Gamble Company, Cincinnati, Ohio

[21] Appl. No.: 309,524

[22] Filed: Oct. 5, 1981

Related U.S. Application Data

[63] Continuation of Ser. No. 167,295, Jul. 10, 1980, abandoned, which is a continuation of Ser. No. 110,959, Jan. 10, 1980, abandoned.

[51] Int. Cl.$^3$ .............................................. B01D 3/10
[52] U.S. Cl. ..................................................... 260/428
[58] Field of Search .................... 260/428; 203/21-23, 203/25, 27, 91, 92, 100

[56] References Cited

U.S. PATENT DOCUMENTS

| 2,422,185 | 6/1947 | Dean | 23/262 |
| 2,621,196 | 12/1952 | Thurman | 260/428 |
| 2,621,197 | 12/1952 | Thurman | 260/428 |

FOREIGN PATENT DOCUMENTS

| 2039531 | 2/1972 | Fed. Rep. of Germany . |
| 1532007 | 11/1978 | United Kingdom . |

OTHER PUBLICATIONS

"Deodorization 1975", C. T. Zehnder, *Journal of American Chemists' Society*, Jun. 1976 (vol. 53); pp. 364–369.
"Deodorizing System Modification for Heat Recovery and Steam Refining of Palm Oil", Gavin et al., *J. Am. Oil Chemists Soc.*, Nov. 1973 (vol. 50), pp. 466A–472A.

*Primary Examiner*—Frank Sever
*Attorney, Agent, or Firm*—Richard C. Witte; Leonard Williamson; Rose Ann Dabek

[57] ABSTRACT

This invention relates to an improved high temperature oil deodorization process for optimum bland taste and flavor maintenance. The process comprises a selective temperature control quenching step of the hot, freshly deodorized oil. This step comprises selectively utilizing a cooling means to quench hot, freshly deodorized oil down to a pumpable bland flavor-stable processing temperature (PBFSPT) within a selected time, preferably within a few seconds, so that the hot deodorized oil can dwell dormant in an energy efficient deodorization system. The oil can then be pumped through heat interchangers without bland oil flavor degradation or can be held at the PBFSP temperature for longer critical dormant times without flavor degradation.

8 Claims, 1 Drawing Figure

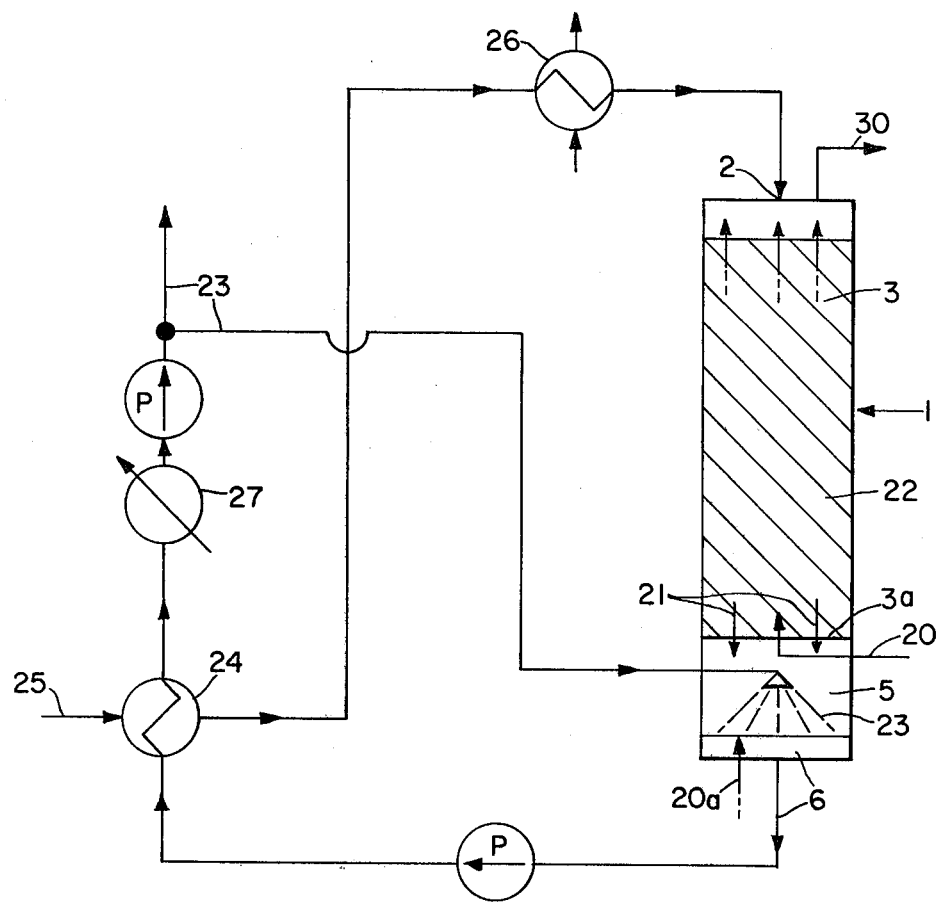

PROCESS TO MAINTAIN BLAND TASTE IN ENERGY EFFICIENT OIL DEODORIZATION SYSTEMS

This is a continuation of application Ser. No. 167,295 filed July 10, 1980, now abandoned, which is a continuation of application Ser. No. 110,959 filed Jan. 10, 1980, now abandoned.

BACKGROUND OF THE INVENTION

In order to build superior taste into edible oil products, they must undergo certain processing steps. The most important, from a finished flavor standpoint, is deodorization. Since the senses of taste and smell are closely linked, deodorization also improves the flavor of the product. The finished product is ideally a bland oil.

About the middle of the last century, deodorization of fats was practiced in Europe by blowing steam through the heated oils. Prior to the turn of the century, steam blowing was used in connection with evacuation for the improvement of fats used in margarine products. About 1900 David Wesson, in the United States, designed a greatly improved steam-vacuum deodorizer. The system successfully avoided air contamination, which is one of the important prerequisites of this high-temperature treatment. The process was never patented, but its secrecy was so effectively guarded that for a great many years competitive efforts failed to match the quality of the products that were treated in the Wesson system.

In addition to improved batch processes, semi-continuous and continuous deodorizers were later developed. The theoretical aspects of steam stripping are governed by Raoult's law and Dalton's law.

Vernon Young in an article published in *Chemistry and Industry* Sept. 16, 1978, pp. 692–703, provides an excellent review of processing currently in use for refining and modifying oils and fats.

High temperature deodorization systems require large amounts of energy, but they can be designed for heat recovery to save energy. For example, a deodorizing system modification for heat recovery and steam refining of palm oil is reported by Gavin et al in J. Am. Oil Chemists Soc., November 1973 (Vol. 50), pp. 446A–472A, incorporated herein by reference in its entirety. Also, U.S. Pat. No. 3,607,670, King, Sept. 12, 1971, relates to a deodorization process in which the heat exchange between incoming cold oil and outgoing hot oil takes place within an enclosed vessel.

The problem of bland oil regression (degradation), however, is a drawback to energy efficient deodorization systems, and particularly prior art modified systems where hot, freshly deodorized oil is held dormant, dwells or is pumped out of the deodorizer at too high of a temperature. Such oils degrade from a bland taste to a scorched or rubbery taste, or degrade to various other flavors which are less than bland.

Thus, there was a need to invent a process whereby optimum heat is utilized and the bland taste of deodorized oil is maintained in energy efficient systems.

It is an object of the present invention to prevent degradation of bland flavor in hot, freshly deodorized oil in high temperature deodorization systems where said oil is held dormant for further processing.

It is another object of the present invention to provide a method to maintain optimum good taste and bland flavor in freshly deodorized oil.

Another object of the present invention is to maximize heat recovery in high temperature deodorization systems while maintaining bland deodorized oil flavor.

Other objects will become apparent in the light of the disclosure.

BRIEF DESCRIPTION OF THE DRAWING

The FIGURE is a pictorial schematic of a continuous deodorizer unit in which this invention is illustrated.

SUMMARY OF THE INVENTION

In view of the above-stated need, the present invention provides a high temperature edible oil deodorization process which utilizes a vacuum deodorization system, said process comprising the steps of:
 (a) stripping odoriferous constituents from said oil at a high temperature to provide a hot, freshly deodorized oil having a bland flavor, said hot, freshly deodorized oil having a temperature of above an outgoing oil bland flavor-stable temperature; and
 (b) cooling said hot, freshly deodorized oil to a storage temperature;
 the improvement comprising utilizing a cooling means to quench said hot, freshly deodorized oil to a pumpable outgoing oil bland flavor-stable processing temperature.

Furthermore, the present invention provides a process for utilizing heat and recovering energy in hot, freshly deodorized outgoing oil in a deodorization system wherein the hot deodorized outgoing oil is utilized to warm up cold undeodorized incoming oil via a heat interchanger means, said process comprising the steps of:
 (a) deodorizing said incoming oil at a temperature of about 425° F. to about 520° F. to provide said hot, freshly deodorized oil having a temperature above a hot pumpable outgoing oil bland flavor-stable processing temperature;
 (b) utilizing a cooling means to quench said hot, freshly deodorized outgoing oil to said hot, pumpable outgoing oil bland flavor-stable processing temperature of from about 480° F. to about 340° F. depending on the type of oil and dormant time prior to cooling; and
 (c) passing said hot, pumpable outgoing oil through said heat interchanger means to warm up said cold undeodorized incoming oil.

DETAILED DESCRIPTION OF THE INVENTION

This invention relates to a high temperature edible oil, deodorization process which utilizes a vacuum deodorization system, said process comprising the steps of:
 (a) stripping odoriferous constituents from said oil at a high temperature to provide a hot, freshly deodorized oil having a bland flavor, said hot, freshly deodorized oil having a temperature of above an outgoing oil bland flavor-stable process temperature; and
 (b) cooling said hot, freshly deodorized oil to a storage temperature,
 the improvement comprising utilizing a cooling means to quench said hot, freshly deodorized oil to a pumpable (outgoing oil) bland flavor-stable processing temperature (PBFSPT).

The invention further relates to a deodorization system which operates with said hot, freshly deodorized oil at a high oil temperature of from about 425° F. to about 520° F., and at a pressure of from about 0.1 mm of mercury to about 30 mm of mercury absolute pressure prior to said quenching, and wherein said outgoing oil is quenched to said pumpable bland flavor-stable processing temperature of from about 480° F. to about 340° F., and wherein said quenched oil is further cooled via heat interchanger means within 30 seconds to about 10 minutes after said quench, and wherein said deodorization temperature and said pumpable temperature, and said time before said further cooling are interdependent upon the type of oil being processed and the type of deodorization system being used.

Preferably, the oil is deodorized at a high oil temperature of from about 460° F. to about 490° F., and the outgoing oil is quenched to a pumpable temperature below about 446° F. within a quench time of about a fraction of a second of about 50 seconds.

In a preferred embodiment, the process of this invention preferably comprises the steps of:

(a) feeding said hot incoming oil into a deodorization vacuum column, deodorizing said incoming oil at an oil deodorization temperature of from about 446° F. to about 520° F. by passing super-heated stripping steam countercurrently through a separate upper deodorizing section of said column, said hot, freshly deodorized oil dropping into a separate lower reservoir of said column;

(b) utilizing said separate lower oil-sealed reservoir in said column as a conduit for said hot, deodorized outgoing oil as it passes into said lower reservoir to be pumped;

(c) utilizing a cooling means in said lower reservoir to quench the temperature of said hot, freshly deodorized outgoing oil down to said pumpable oil temperature of below about 446° F. within a quench time of about a fraction of a second to about 50 seconds.

The preferred cooling means for quenching the oil is previously deodorized cooled quenching oil brought in contact with said hot, freshly deodorized oil. Preferably, the quenching oil is directly mixed with said hot outgoing oil as the hot outgoing oil passes into said lower, oil-sealed reservoir. Furthermore, the preferred hot, freshly deodorized outgoing oil has a temperature of from about 460° F. to about 490° F. when it passes into the lower, oil-sealed reservoir, and said quenching oil has a maximum temperature of about 140° F. In another preferred embodiment, a pool of outgoing oil in said oil-sealed reservoir is agitated with stripping steam.

The deodorization steam temperature is not critical, and can range from about the boiling point of water at the inlet pressure to about 600° F. Water can even be introduced in lieu of steam, since the water would be immediately vaporized and heated to the deodorization temperature by contact with the hot deodorized oil in the lower portion of the deodorization column 1 and any other hot materials which the water contacts. It cools the apparatus and makes deodorization less efficient. On the other hand, steam at a temperature in excess of about 600° F. can scorch the oil, and it is unnecessary to use such high temperature steam. It is preferred that the steam temperature be within about 20° F. of the oil temperature; cooler steam cools the oil, and hotter steam is unnecessary. Thus, the preferred temperature of steam is broadly from about 410° F. to about 540° F.; when the oil is within the preferred temperature range of from about 460° F. to about 490° F., the preferred steam temperature ranges from about 440° F. to about 510° F.

Throughout this specification reference is made to steam as the deodorization agent. Steam is highly preferred for this purpose as it is readily available in high purity and because it does not injure the oils being deodorized. Other deodorization agents can be used, however, for example, gases which are inert under the conditions of the process, such as nitrogen or hydrogen. Oxygen and air are unsuitable, however, as they would cause oxidation and degradation of the oils being deodorized.

The deodorization chamber per se and its components can be any type of packed vapor-liquid contacting chamber, such as those which are well known in the chemical engineering art. See, for example, R. H. Perry et al, eds., Chemical Engineers'Handbook (McGraw-Hill, 4th ed., 1963), p-. 18–25 to 18–53; J. S. Eckert et al, Chemical Engineering Progress 54, No. 1, 70–75 (January 1958), 57, No. 9, 54–58 (September 1961), 59, No. 5, 76–82 (May 1963), and 62, No. 1, 59–67 (January 1966); and K. E. Porter, Chemistry and Industry 182–89 (Feb. 4, 1967). These references also describe various kinds of packing materials which can be used.

The edible oils which can be deodorized by the process of this invention include various substances of plant or animal origin which consist predominantly of glyceryl esters of fatty acids, e.g. triglycerides, including both those commonly called "oils" which are liquid at atmospheric pressure and room temperature, and those commonly called "fats" which are solid or semi-solid under these conditions, but liquid at the temperature of heat-bleaching and deodorization (i.e. about 350° F. to 520° F.). Preferred oils are tallow, lard, and the common edible vegetable oils used for the production of salad oil and shortenings, e.g. cottonseed, peanut, safflower, palm, soybean, rapeseed, sunflower, corn, and coconut oils. The invention is particularly applicable to the heat efficient deodorization of sunflower seed oil.

The selection of a pumpable bland flavor-stable processing temperature within the range of about 480° F. to about 340° F. is interdependent on the type of edible oil being processed and the dormant oil times of the deodorization system being used.

Preferably, the bland flavor-stable outgoing oil is pumped at a temperature above about 340° F. for heat recovery via heat interchanger means.

The improved process of this invention is designed for utilizing heat and recovering energy in hot, freshly deodorized outgoing oil in a deodorization system wherein the hot deodorized outgoing oil is utilized to warm up cold undeodorized incoming oil via a heat interchanger means, said process comprising the steps of:

(a) deodorizing said incoming oil at a temperature of about 425° F. to about 520° F. to provide said hot, freshly deodorized oil having a temperature above a hot pumpable outgoing oil bland flavor-stable processing temperature;

(b) utilizing a cooling means to quench said hot, freshly deodorized outgoing oil to said hot, pumpable outgoing oil bland flavor-stable processing temperature of from about 480° F. to about 340° F.; and (c) passing said hot, pumpable outgoing oil through said heat interchanger means to warm up said cold undeodorized incoming oil.

Industrial Application

The method of this invention is useful in all types of deodorization processes which can be modified to: (1) quench the temperature of the hot, freshly deodorized oil to a bland oil flavor-stable temperature before pumping the hot oil through a heat interchanger to warm up cold incoming oil. Thus, it will be clear to those skilled in the art that an important principle of this invention is that hot, freshly deodorized oil must be quenched to its bland flavor-stable temperature before it can be held dormant for further processing.

The term "dormant oil" is defined herein as hot deodorized oil, held in a tray or reservoir as a pool without sparging or significant steam stripping or simply oil that is being pumped. Dormant oil can be oil that dwells in an oil-sealed reservoir. Dormant oil can be oil pumped through a line or heat interchanger. Dormant deodorized oil held beyond its critical dormant time at a temperature above its bland flavor-stable temperature, will degrade. The term "dormant time" as used herein technically refers to the time freshly deodorized oil dwells in a deodorization process that is no longer being sparged or stripped.

The term "pumpable bland flavor-stable processing temperature of a deodorized oil" refers herein to a temperature or temperature range at which hot deodorized oil can be held "dormant" or pumped without loss of its bland flavor. There is a maximum pumpable bland flavor-stable processing temperature for each particular oil and each oil has a unique dormant process time-temperature interdependency wherein said dormant process time increases as the temperature decreases.

The term "quenched oil" as used herein refers to hot, freshly deodorized oil that has been cooled to its PBFSPT. The term "quench time" is that time required to reduce the temperature for the deodorization temperature to the PBFSPT. There is a critical quench time for each particular oil and each oil has a unique critical process quench time—PBFSP temperature interdependency wherein said critical quench process time increases as the hot deodorization temperature decreases.

Therefore, the specific process or system used is also a factor in selecting times and temperatures since the equipment limitations will determine the requisite time that the oil is held "dormant" at various processing temperatures. Hot oil selectively quenched to its maximum bland flavor-stable processing temperature can be safely pumped through heat interchangers which utilize the heat of the hot outgoing oil to warm up cold incoming oil.

The incoming oil of this invention is refined and bleached oil or oil which has been processed with one or more of the following processes: refined, bleached, hydrogenated, winterized, dewaxed, interesterified, etc.

For a more detailed disclosure of the types of refined and processed oils useful as incoming oil for the present invention, U.S. Pat. No. 4,035,402, Levine, July 12, 1977, is incorporated herein by reference in its entirety.

Steam-vacuum deodorization is preferred. The process consists of steam stripping or steam distilling of the volatile odoriferous constituents at elevated temperature and reduced pressure.

The most common shape of the batch deodorizer is a cylindrical vessel two to four times as high as it is wide. Provision is made to heat the oil internally or externally by steam, direct firing, or "Dowtherm"$^{TM}$ vapor. "Dowtherm" is a eutectic mixture of diphenyl and diphenyl oxide which is reportedly more suitable then steam because of the high temperature range that is required for deodorization. The vacuum equipment consists of multistage steam ejectors with barometric condensers. Stripping steam is introduced at the bottom by means of spiders or orifice plates. Good steam distribution is essential, as it provides the additional advantage of effective agitation. The classical batch deodorization cycle usually is from 4 to 8 hours. Batch deodorization systems can be modified to recover the heat of the hot, deodorized oil by determining the oil's bland, flavor-stable temperature and quenching the oil to that temperature with a cooling means. The hot quenched deodorized oil can then be safely pumped to heat cooler incoming oil. Some sparging of the hot, deodorized oil for agitation is preferred.

A semi-continuous system designed by the Girdler Corporation has found large-scale application. It consists essentially of a large cylindrical vessel containing five pans. A motor-operated timing device opens and closes valves automatically. They regulate the flow of product from the higher to the next lower pan. The oil is preheated and de-aerated in the top pan. In the second pan the temperature of the charge is increased to about 240° C. Deodorization is mainly carried out in the third and fourth pans. In the last pan the temperature is reduced by water cooling while the product continues to be steam stripped under vacuum. The total operating time is about 2½ hours. In a modified system, heat recovery can be accomplished by determining the bland, flavor-stable processing temperature of the oil and following the guidelines set out herein.

Several continuous deodorizers also are widely used. The system manufactured by Foster Wheeler Corporation consists essentially of a vertical stainless steel column provided with trays and bubble caps. The oil, cascading from top to bottom, moves counter-currently to the ascending steam. U.S. Pat. No. 3,542,653, Lowrey et al, Nov. 24, 1970, relates to an apparatus and process for continuous heat-bleaching and high temperature steam deodorization of edible oils. The teachings of the Lowrey et al patent are incorporated herein by reference in their entirety.

As stated above, in some processes some steam stripping of the "dormant" hot deodorized oil is preferred during the quenching step for agitation while the hot oil is dwelling prior to being pumped. It provides agitation and also assures the maintenance of optimum bland oil flavor in some systems. Less steam is needed for this agitation than is required for deodorization.

This invention is mainly described herein in the context of a continuous deodorization process. However, it will be apparent to those skilled in the art, in the light of this disclosure, that the principles of this invention are equally applicable to modified batch and semi-continuous deodorization processes which are modified to utilize the heat of the outgoing hot deodorized oil to save energy. The hot deodorized oil in a modified system must be quenched if it is to be momentarily held dormant, e.g. as a pool in a vacuum oil-sealed reservoir means prior to pumping it to heat interchangers.

The FIGURE shows a deodorizing unit 1 having a hot incoming oil feed inlet 2. The deodorization unit 1 comprises packing 3 supported on a screen means 3a, which are standard items in the art. The hot incoming oil 2 is treated with super-heated stripping steam 20 in the upper chamber 22 inside the unit 1 to sparge and strip out odor-forming matter from the oil. The unit 1 also has a separate lower cooling reservoir 5 containing a pool of dormant hot deodorized outgoing oil 6. The reservoir 5 receives a steady stream of hot, freshly deodorized oil 21 falling from the upper chamber 22 of the unit 1. There the hot, freshly deodorized oil 21 is cooled to a bland flavor-stable processing temperature by the quenching oil 23 in the lower reservoir 5 before it is pumped through the heat interchanger means 24 wherein cold incoming oil 25 is warmed by the hot quenched deodorized oil 6 before said incoming oil 25 is finally heated with a high temperature heating means 26. The hot quenched deodorized oil is finally cooled to 120° F.–140° F. by a cooler means 27 which is preferably a water cooler. The means 24, 26 and 27 preferably comprise a battery of heaters or heat interchangers.

For a detailed disclosure of deodorization systems in general, packing, bubble caps, residence times, etc. which are not inconsistent with this invention, the Lowry U.S. Pat. No. 3,542,653, supra, is incorporated herein in its entirety.

The FIGURE illustrates a system whereby heat is recovered and the bland flavor of the deodorized oil is maintained. The quenched deodorized oil 6 after passing through the heat interchanger means 24 is further cooled via cooler 27 to a packing (storage) safe temperature of about 120° F. to 140° F., which cooled oil 23 can also be used as quenching oil 23.

The continuous deodorization unit quench, "CDU quench" method is a preferred embodiment of this invention. The preferred method comprises showering recycled cooled deodorized quenching oil 23 through a quenching means 24 onto a pool of quenched deodorized oil 6 in the cooling reservoir 5 to quench and agitate the hot, freshly deodorized oil 21 as it drops into said oil pool 6. The hot, freshly processed deodorized oil 21 is rapidly quenched to a bland flavor-stable processing temperature oil within a fraction of a second. Additional agitation of the quenched oil 6 can be provided by stripping steam 20a or water simply injected into the pool of oil. An alternative quenching means for cooling the hot, freshly deodorized oil comprises injecting the quenching oil directly into the oil pool 6.

As stated earlier, the preferred pumpable bland flavor-stable temperature of a particular oil varies from oil to oil and from system to system. The maximum temperature at which hot deodorized oil can be pumped to recover heat in a deodorization process while the bland flavor of the freshly deodorized oil is maintained, is preferred. The preferred bland flavor-stable temperature, from an energy efficient standpoint, is the maximum temperature of the hot deodorized outgoing oil at which the bland oil flavor is maintained in a heat recovery step. In a preferred embodiment the maximum heat of the hot deodorized oil is used in a heat interchanger means to save energy.

An alternative to a direct oil-to-oil quench is submerged internal heat exchanger coils which are used to quench the hot, freshly processed deodorized oil in reservoirs like reservoir 5, shown in the FIGURE. Such types of heat exchangers must cool the hot oil down to its bland flavor-stable processing temperature fast enough to maintain optimum good taste and bland flavor in deodorized oil, i.e. within the critical quench time.

Alternate methods and equipment for quenching hot, freshly deodorized oil to bland flavor-stable temperature, other than an oil-sealed lower cooling reservoir like 5 are contemplated as within the scope of this invention. A typical example of such devices are found in: "Deodorization 1975", C. T. Zehnder, Journal of American Oil Chemist's Society, June 1976 (Vol. 53), and Gavin et al, J. Am. Oil Chemist's Society, November 1973, pp. 466A-477A (Vol. 50). Both of these references are incorporated herein in their entirety.

It was surprisingly discovered that hot, freshly deodorized oils having too high of a temperature to be safely pumped could be quenched to a slightly lower but bland flavor-stable temperature to avoid flavor degradation before pumping. Sunflower seed oil is a very difficult oil to deodorize. It is preferably deodorized at a high temperature of about 490° F. to about 460° F. in a continuous deodorizer. The freshly deodorized sun oil must be quenched in a CDU to its flavor process stable temperature of about 445° F. to about 410° F. within a quench time of about a fraction of a second to within about 50 seconds.

Again, it has been discovered that hot, freshly processed deodorized oil which has optimum good taste (a bland flavor) will degrade rapidly if held dormant at too high of a temperature without sparging (stripping) under vacuum. Hot, freshly deodorized sunflower seed oil at high deodorization temperatures held dormant for just a few seconds can show degradation. It was surprisingly discovered that hot quenched deodorized sunflower seed outgoing oil having a temperature below about 445° F. in a CDU, as illustrated, maintains its optimum good taste and bland flavors, but unquenched freshly deodorized outgoing sunflower seed oil shows degradation when held dormant. Short dormant (dwell) times, e.g. about 60 seconds and less, in a continuous pool in a reservoir like reservoir 5 and associated piping to cooler 24 of a CDU at high deodorization temperatures is enough to significantly degrade the oil, if not quenched. Similar degradation would happen in modified batch and semi-continuous processes so designed to recover the maximum heat of the freshly deodorized oil.

In a CDU system, as shown in the FIGURE, sunflower seed oil can be deodorized at a temperature of from about 446° F. to about 510° F., and preferably 460° F. to 490° F. The hot, freshly deodorized outgoing oil 21 dribbles out of the upper chamber 22 down into the lower reservoir. Thus, hot, freshly deodorized outgoing oil 21 is quenched in reservoir 5 with quenching oil 23 to a temperature of below about 445° F., its bland flavor-stable temperature. It is preferably quenched to a temperature of about 410° F.±5° F. within a quench time of about a fraction of a second.

The hot, freshly deodorized oil is preferably quenched by mixing it with 120°-140° F. prior deodorized quenching oil 23. This step in a CDU is preferably accomplished by spraying a shower of the quenching oil 23 into the lower reservoir 5 of a CDU system whereby the hot and cooled oils are contacted, mixed and agitated.

The quenched deodorized outgoing oil 6 in the reservoir 5 can then be safely pumped out for further cooling, e.g. via a heat interchanger cooler 24 and then further cooled via cooler 27 to a packing or storage stable temperature of about 130° F.±10° F. The oil is then pumped to a storage tank, packed or recirculated to the cooling reservoir 5 as cool quenching oil 23.

Heat interchanger cooler 24 is preferably designed to also heat up incoming oil 25 and thereby save energy.

The ratio of quenching oil to hot, freshly deodorized oil, needed to quench to a bland flavor-stable processing temperature, will vary depending on the respective oil temperatures, dwell times and the particular deodorization process being applied.

The bland flavor-stable processing temperature for a particular oil within a particular dwell time for a particular system can be determined by trial and error. The critical factor is to determine the pumpable bland flavor-stable processing temperature (PBFSPT) of the oil being processed. One method of determining the PBFSPT would be to withdraw a series of samples of hot, freshly deodorized oil from a batch deodorization system at decreasing temperatures and quenching them to various temperatures at increasing times. Soybean oil, for example, has a maximum PBFSPT of about 480° F. in a CDU system as shown in the FIGURE. Soybean oil can be deodorized at a temperature as high as 510° F.

Procedure to Determine the PBFSPT

The following describes a procedure used to determine the PBFSPT of deodorized oils. Equipment is a 20 lb. capacity batch deodorizer under which is mounted a small stainless steel sample vessel connected by two valves. The sample vessel is also vented up to the top of the deodorizer via a valved vent line. The procedure for its operation is: inlet oil is charged into the deodorizer and deodorized at desired temperature and time to achieve a suitably bland flavor. Bland flavor is verified by withdrawing an oil sample into the sample vessel and immersing the sample vessel into an ice bath while it is connected to the deodorizer and opening the vent line to the top of the deodorizer to equalize the pressures. Both valves connecting the sample vessel with the deodorizer itself are then opened, allowing oil to freely drain from the deodorizer through the two valves and into the sample vessel. Cooling of the oil draining into the sample vessel is almost instantaneous, as its walls are essentially held at ice bath conditions by the external ice bath. The sample of deodorized oil thus withdrawn is then tasted by expert oil evaluators to determine that it is suitably bland. This sample is the flavor control. When testing, the sample vessel is not precooled in an ice bath; but rather, the sample is first withdrawn and, after withdrawal, the sample vessel is cooled in an ice bath, which cooling is not commenced until a few seconds after sample withdrawal, e.g. 2, 5, 10, 15 or 30 seconds or more. The temperature of the deodorized oil is reduced to various temperatures to provide several different sampling temperatures. This process is repeated for several different quenching times and several different sampling temperatures to produce a map of flavor grades versus the control. This map of time and temperature allows one to select the PBFSPT by giving the artisan an understanding of the time at which the oil can be held at a specified temperature before it starts to degrade.

EXAMPLES 1–9

The specific conditions of Examples 1–9 are set out in Table I. The equipment used is illustrated in the FIGURE. Undeodorized, refined and bleached sunflower seed incoming (inlet) oil was used for each run. Superheated stripping steam 20 was introduced at a rate of about 0.5% by weight of the incoming oil 2. The steam is introduced via steam inlet 20 below the screen 3a level and is drawn through the upper chamber 22 via vacuum source 30.

As shown in the FIGURE, some additional sparging steam 20a can be introduced below the surface of the pool of quenched oil 6 in the reservoir 5 for agitation and good measure. Column operating pressures of about 5 mm of mercury absolute pressure maximum were maintained at the top of the column with a maximum operating pressure differential (ΔP) across the column of about 24 mm of mercury. Preferably, a ΔP of about 15 mm of mercury are maintained. A ΔP of about 30 mm of mercury is not too high. Results of several runs under various conditions are shown in Table I.

The temperature of the hot incoming oil 2 approximates the temperature of the hot, freshly deodorized oil 21 in each run. The residence time of oil in the upper chamber 22 of the unit is about a minute and the residence time of the oil in reservoir 5 plus pumping time to interchanger 24 of the unit is about 1 to 2 minutes. The ratios of the quenching oil to hot, freshly deodorized oil fed into the system were adjusted to achieve the desired pool temperature shown in the Table.

The pool temperatures of Examples 2, 3, 4, 7, 8 and 9 illustrate some preferred PSFSPTs of this invention.

TABLE I

| Run | Incoming Oil Temperature | Quench Oil Temperature | Pool Temperature | DOF |
|---|---|---|---|---|
| 1 | 484° F. | No Quench | (480° F.) | 7.1 |
| 2 | 465° F. | 130° F. | 440° F. | 8.0 |
| 3 | 465° F. | 130° F. | 410° F. | 8.0 |
| 4 | 484° F. | 120° F. | 405° F. | 7.6 |
| 5 | 468° F. | No Quench* | (460° F.)* | 7.3 |
| 6 | 480° F. | No Quench* | (480° F.)* | 7.3 |
| 7 | 484° F. | 120° F.* | 445° F.* | 7.8 |
| 8 | 460° F. | 120° F.* | 410° F.* | 7.7 |
| 9 | 486° F. | 120° F.* | 410° F.* | 7.7 |

*Pool sparge with steam

Deodorized oil flavor (DOF) is subjectively evaluated on a 10:1 grading scale with 10 being a bland oil and 1 having a very objectionable or strong off-flavor. A 0.2 flavor differential is significant. As can be seen, oils deodorized without the aid of the quench system of this invention graded lower in flavor quality than all the oils deodorized using the quench system of this invention.

Compare unquenched run 1 with quenched run 4. They respectively had deodorized oil flavors of 7.1 and 7.6. Both were dormant in the oil pool 6 and were pumped dormant at temperatures of 480° F. and 405° F., respectively. Also compare the flavors of unquenched sparged pool oil run 6 pumped at 480° F. with quenched, sparged pool oil run 7 pumped at 445° F. which were respectively 7.3 and 7.8.

The hot, freshly deodorized oils of runs 2, 3, 4, 7, 8 and 9 were quenched to their PBFSP temperatures within 50 seconds and probably within 10 seconds. The residence or dwell times in the pool 6 of reservoir 5 were each about 1–2 minutes.

Comparing run 1, unquenched and dormant oil, with runs 5 and 6, unquenched and steam sparged oils, gives a direct comparison of the effect of steam sparging on oil quality. These runs had deodorized oil flavors of 7.1, 7.3 and 7.3 respectively. This comparison shows that steam sparging is directionally preferred and does improve flavor. This improvement, however, is overshadowed by the greater flavor improvement achieved via quenching. Steam sparging is directionally better but optional.

In all of the runs (1–9) pool oil 6 was pumped to heat exchanger 24 whereby the cooler inlet oil 25 was warmed to save energy. Less energy was required to heat the inlet oil via high temperature heater means 26 to the desired inlet deodorization temperature.

What is claimed is:

1. A continuous vacuum deodorization process comprising the steps of:
   (a) deodorizing edible oil at a temperature of about 520° F. to about 425° F. and a pressure of from about 0.1 mm to about 30 mm of mercury;
   (b) quenching the deodorized oil of step (a) to a flavor-stable temperature of about 480° F. to about 410° F. within about 50 seconds by mixing the deodorized oil with quenching oil having a temperature substantially below the flavor-stable temperature;
   (c) recovering the heat from quenched oil by passing the quenched deodorized oil through a heat interchanger means located outside the deodorizer vessel.

2. The process of claim 1 wherein the deodorization temperature of step (a) is about 490° F. to about 460° F., and wherein the deodorized oil of step (b) is quenched to a flavor-stable temperature below about 446° F. within a fraction of a second to within about 50 seconds.

3. The process of claim 1 wherein said edible oil is selected from the group consisting of sunflower seed oil, soybean oil, safflower seed oil and corn oil.

4. A continuous vacuum deodorization process comprising the steps of:
   (a) deodorizing oil with steam at a temperature of from about 520° F. to about 446° F. and a pressure of about 0.1 mm to about 30 mm of mercury absolute;
   (b) quenching the deodorized oil of step (a) to a bland, flavor-stable temperature of from about 410° F. to about 446° F. in a fraction of a second to within about 50 seconds by mixing said oil with deodorized quenching oil, said quenching oil having a temperature substantially below 410° F.;
   (c) recovering the heat from quenched oil by passing the quenched deodorized oil through a heat interchanger means located outside the deodorizer vessel.

5. The process of claim 4 wherein said deodorized oil of step (a) has a temperature of about 490° F. to about 460° F. and said quenching oil has a maximum temperature of about 140° F.

6. The process of claim 5 wherein step (b) further comprises agitating the deodorized oil with sparging steam while cooling.

7. The process of claim 4 wherein said oil is a refined and bleached sunflower seed oil.

8. A deodorization process according to claim 7 comprising the steps of:
   (a) passing oil into a deodorization vacuum column, wherein said oil is deodorized at a temperature of from about 520° F. to about 446° F. by passing steam countercurrently through said oil;
   (b) passing the hot deodorized oil into a separate reservoir of said deodorization vacuum column;
   (c) quenching said hot deodorized oil to a temperature below about 446° F. within about 50 seconds by mixing said oil with deodorized quenching oil having a temperature below 140° F.;
   (d) recovering the heat from quenched oil by passing the quenched deodorized oil through a heat interchanger means located outside the deodorizer vessel.

* * * * *